May 8, 1956 R. C. INGRAHAM 2,745,045

SEMICONDUCTOR DEVICES AND METHODS OF FABRICATION

Filed July 19, 1952

INVENTOR
ROBERT C. INGRAHAM
BY Paul S. Martin
ATTORNEY 2,745,045

SEMICONDUCTOR DEVICES AND METHODS OF FABRICATION

Robert C. Ingraham, Danvers, Mass., assignor to Sylvania Electric Products Inc., a corporation of Massachusetts Application July 19, 1952, Serial No. 299,804

12 Claims. (Cl. 317—236)

The present invention relates to processing of semiconductor translators and transducers, including diodes for rectification and like rectifying contact semiconductor devices, and to such translators and transducers as products.

In typical rectifying-contact devices, one or more contact elements are held against a semiconductor element and supported to prevent shifting of the elements from initially adjusted positions. Difficulty has been encountered in maintaining the desired adjustment of the semiconductor and contact elements during further processing of the device, and thereafter during its useful life.

Accordingly, the present invention contemplates the provision of novel stable semiconductor devices. In particular a feature of the invention resides in the provision of a physical construction facilitating adjustment of initial arrangement of the elements and of their contact pressure and promoting stability thereafter.

In accordance with a further aspect of the invention, an improved method of producing translators and transducers is provided which is compatible with the requirements of low unit cost, uniformity in the semiconductor characteristics, long term stability, and adaptability to routine and orderly manufacture.

The nature of the invention will be better appreciated from the following detailed description of an illustrative embodiment, when taken in conjunction with the drawings, wherein.

Figure 2:
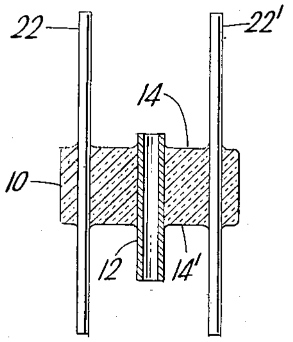
Fig. 2 is an elevational view of a support employed in a first stage of processing the transistor of Fig. 1.

The invention has been illustrated in connection with a stable transistor construction but it is to be expressly understood that other applications are contemplated as, and for example, diodes for rectification, and photo detectors. In the transistor shown in Fig. 1, circular button 10 such as the glass type commonly used in the assembly of radio tubes, has molded therein a tubular sleeve 12 arranged axially of the base 10 and forming part of a telescoping mount. The tubular sleeve 12 projects beyond the opposite faces 14, 14' of the base 10 and receives lead 16 which forms the other part of the telescopic mount.

The lead 16 is initially adjustable endwise relative to the base 10 and is formed with a bent portion or platform 18 adjacent one end supporting a semiconductor element 20. Lead 16 is preferably fabricated of copper or dumet so that the semiconductor element 20, usually a polished and etched chip of crystalline germanium, may be soldered directly to the platform 18.

The guide sleeve 12 and lead 16 of the telescopic mount are mechanically united. This may be accomplished by welding or soldering lead 16 to the guide sleeve 12 or by merely deforming the sleeve 12 sufficiently to firmly grip the lead 16 and prevent axial displacement of the latter.

Additionally, the base 10 further has molded therein a pair of spaced leads 22, 22', as of dumet or other suitable metal for sealing to glass, which are arranged on opposite sides of tubular sleeve 12 and project from the opposite faces 14, 14' of the base 10. The ends of the leads 22, 22', projecting from the face 14 of the base 10, support rectifying contact elements 24, 24' formed of transversely extending resilient whiskers of appropriate metals and having prepared points 26, 26' disposed in a common plane and in contact with the adjacent surface of the semiconductor body 20. The prepared points 26, 26' are laterally spaced and aligned, and in critical pressure engagement with the semiconductor body 20.

A mass 28 of a heat stable silicons of grease-like or of paste consistency completely surrounds the semiconductor and point contact elements and the adjacent supporting leads. The insulating grease, which is employed for a purpose to be subsequently described, is not water absorbent and is stable in consistency and composition over a wide range of temperatures. One such material capable of maintaining a constant viscosity over a large temperature range is organo poly siloxene grease which due to its non-organic properties additionally permit the germanium chip 20 to be pulsed in the presence of the insulating grease without vaporizing or decomposing the grease. The electrically completed subassembly including the silicone surrounded point contact elements 24, 24' and the semiconductor element 20 is provided with an encasing body of a resin, particularly those commonly termed casting resins. Casting resins suitable for forming the insulating body are generally low temperature polymerizing compouds, one example being, methyl methacrylate. As pointed out the viscous mass 28 completely surrounds the point contact elements 24, 24', the semiconductor 20 and the adjacent supporting ends of the leads 18, 20, 20', thereby preventing transmittal of mechanical stresses applied to or developed in the body 30 to the resilient whiskers 24, 24'.

Figure 3:
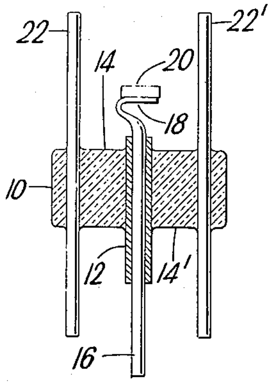
Fig. 3 is an elevational view of the support of Fig. 2 in a further stage of processing, shown assembled with a semiconductor element.

In making semiconductor devices such as the illustrative transistor, the glass base or button 10 is integrally formed with parallel guide sleeve 12 and one or more leads 22, as seen in Fig. 2. This supporting subassembly is temporarily mounted in an adjusting fixture whereupon the semiconductor lead 16, as shown in Fig. 3, is inserted in the guide sleeve 12. Prior to inserting the lead 16 of the telescopic mount in the sleeve the semiconductor element 20 is affixed thereto as, for example, by soldering directly to platform 18. Whiskers 24, 24' are rigidly secured to the leads 22, 22', preferably by spot welding and the prepared points 26, 26' properly aligned and spaced with the aid of magnifying shadowgraph equipment or the like.

Figures 1, 4, 5:
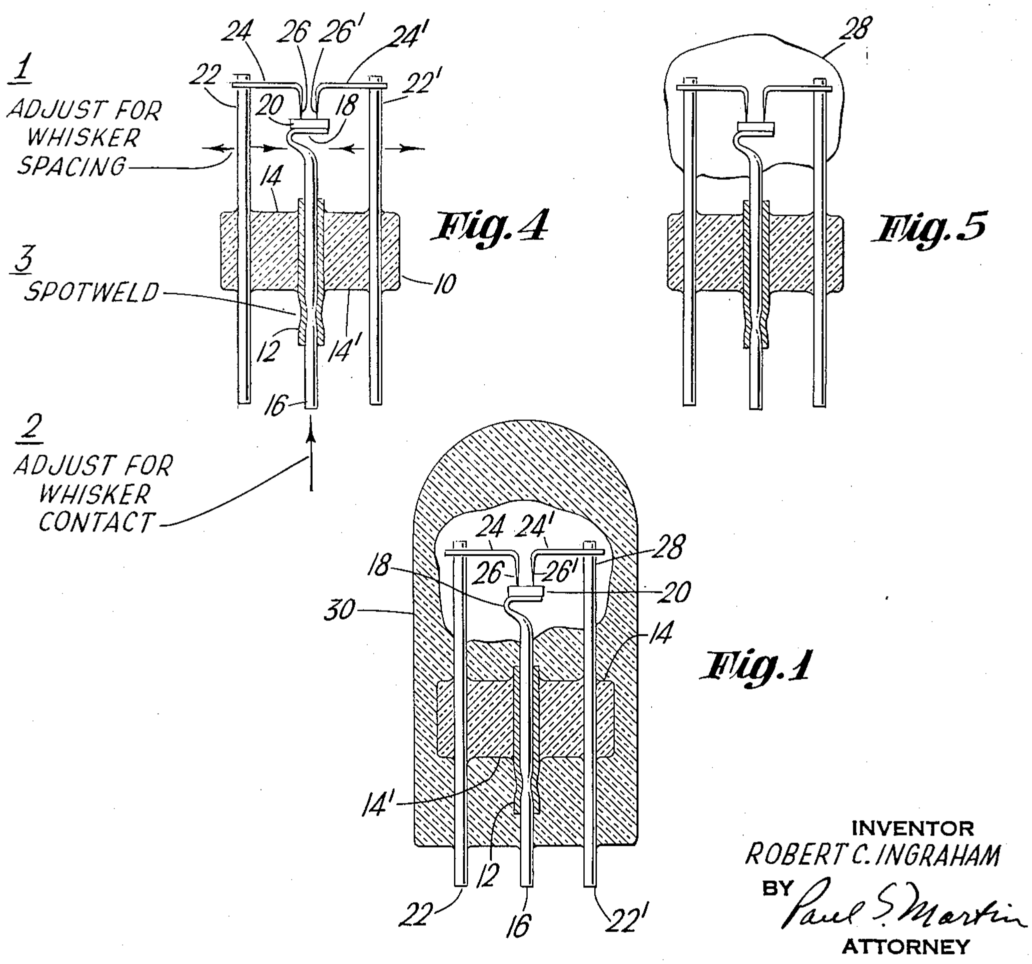
Fig. 1 is an elevational view, partly in section and on a greatly enlarged scale, showing an illustrative transistor unit embodying features of the present invention.
Fig. 4 is an elevational view of the subassembly of Fig. 3 in a further stage of processing, and including point contact elements engaging the semiconductor element.
Fig. 5 is an elevational view of the electrically completed transistor unit of Fig. 4 preparatory to completion.

The electrically completed unit of Fig. 4 is adjusted to achieve proper initial contact, advantageously with the aid of concurrent electric tests. This is accomplished by axially shifting lead 16 relative to the base 10 until the proper contact is obtained and immediately thereafter mechanically uniting the lead 16 and sleeve 12 of the telescopic mount. This mechanical joining of the sleeve 12 and the lead 16 may be brought about by welding the sleeve and lead together or by deforming the sleeve. Once the lead 16 and sleeve 12 are secured together further movement of the semi-conductor relative to the base 10 is precluded and the base serves as a fixed reference. Thereupon the adjusted transistor can be removed from the adjusting and supporting fixtures as well as the electrical and optical test equipment, and this equipment is then available without delay for use in assembling further units.

As seen in Fig. 4, the electrically completed transistor unit is then ready to be encased by the plastic body 30. Such plastic usually has a thermal coefficient different from that of the various metal components of the semiconductor device and if the whiskers 24, 24′ were embedded directly in the plastic, temperature changes would tend to shift the prepared points 26, 26′ relative to each other and to the semiconductor element 20. Such variations in temperature might cause erratic changes in semiconductor characteristics and risk creating open circuits and/or permanently damaging the units. These drawbacks become more pronounced due to the tendency of the plastic itself to warp with age, thereby setting up random stresses liable to displace the point contact elements 24, 24′ relative to each other and to the prepared surface of the semiconductor element 20.

Accordingly, and as seen in Fig. 5, prior to encasing of the electrically completed unit it is desirable to surround the point contact elements 24, 24′ and part of their supporting leads as well as the semiconductor element 20 by the mass 28 of insulating grease. This mass insulates the resilient point contact elements against mechanical shifting due to the expansion and contraction of the plastic body. Since the leads themselves are sufficiently rigid to resist significant deformation by the plastic as the latter sets up stresses the initial proper contact is preserved. Where the mass is of silicone, it maintains its consistency during the molding operation, to be subsequently described, it is chemically inert, and it has been found to be immiscible with the casting polymers so as to permit the molding to be carried out.

The completed transistor unit with the protective insulating mass surrounding the contact region is then immersed into a fluid insulating casting resin. During the molding of the body the rigid and electrically completed unit is immersed to a depth sufficient to seal off one or both ends of the guide sleeve 12 thereby minimizing atmospheric attack of the processed semiconductor body. It is to be noted that the insulating grease 28 additionally serves to exclude the atmosphere from the contact region that is susceptible to deleterious atmospheric attack. Plastics normally tend to absorb moisture which might penetrate to the contact region if not for the presence of the silicone protective mass. Accordingly, failure with storage or prolonged exposure to high humidity atmospheres is minimized due to the presence of the silicone mass.

Where the leads supporting the point contact and semiconductor are relatively close together and extend in the same direction (which may be designated as a "single-ended" construction) it may be feasible to omit the grease in accordance with the teachings of U. S. Patent No. 2,586,609.

However, the insulating grease provides assurance that possible absorption of moisture by the plastic will not reach the contact region. Additionally minor mechanical stresses which may be set up even in the construction of the aforesaid patent, will be minimized due to the presence of the silicone mass.

From the foregoing, it is apparent that semiconductor devices constructed and processed in accordance with the principles of the present invention provide for electrically completed units which may be subsequently encased in a rigid insulating body, yet will be substantially unaffected by changes in ambient temperature. Further the processed units have long-term stability and only a relatively small percentage will become defective or fail with shelf life. Variations in detail, and varied application of the several aspects of the invention will occur to those skilled in the art; and accordingly the appended claims should be broadly construed consistent with the spirit and scope of the invention.

What I claim is:

1. An electrical device comprising a base, a lead projecting from said base, a point contact element spaced from and supported on said base by said lead, a semiconductor element adapted to be engaged by said point contact element, a telescoping metallic mount having a fixed sleeve supported on said base and a lead slidable within said sleeve for adjustment relative thereto, and supporting said semiconductor element, and a rigidified insulating body surrounding the assembly of said elements and maintaining said elements in an adjusted position.

2. An electrical device comprising a base, a lead projecting from said base, a point contact element spaced from and supported on said base by said lead, a semiconductor element adapted to be engaged by said point contact element in a contact region, an insulating grease surrounding said elements adjacent said contact region, a telescoping mount for said semiconductor element and supported on said base for adjustment relative thereto, and a rigidified insulating body surrounding the assembly of said elements and maintaining said elements in an adjusted position.

3. An electrical device comprising a base, a lead projecting from said base, a point contact element spaced from and supported on said base by said lead, a semiconductor element adapted to be engaged by said point contact element, a telescoping mount for said semiconductor element and supported on said base for adjustment relative thereto, and a rigidified insulating body surrounding the assembly of said elements and maintaining said elements in an adjusted position, said telescoping mount including a guide member extending through and supported within said base, a lead slidably received and supported within said guide member and operatively connected to said semiconductor element, and means for mechanically uniting the lead and guide member of said telescoping mount when in said adjusted position.

4. A semiconductor device comprising a base, a point contact element spaced from and supported on said base, a semiconductor element, means for supporting said semiconductor element for adjustment relative to said point contact element and for engagement by the latter with a predetermined contact pressure in a contact region, an insulating grease surrounding said elements adjacent said contact region, and a rigidified insulating body encasing the supported point contact and semiconductor elements and fixing said elements in an adjusted position.

5. A semiconductor device comprising a base, a point contact element spaced from and supported on said base, a semiconductor element, means for supporting said semiconductor element for adjustment relative to said point contact element and for engagement by the latter with a predetermined contact pressure, an insulating grease completely surrounding said point contact and semiconductor elements, and a rigidified insulating body encasing the supported point contact and semiconductor elements and fixing said elements in an adjusted position.

6. An electrical device comprising a circular base, a lead projecting from said base and supported transversely thereof, a point contact element carried by said lead, a semiconductor element adapted to engage said point contact element, an adjustable telescoping mount arranged axially of said base and connected to said semiconductor element for supporting the latter in engagement with said point contact element, and a rigidified insulating body completely surrounding the assembly of the supported elements and fixing said elements in an adjusted position.

7. An electrical device comprising a base, a lead projecting from said base and supported thereon, a point contact element carried by said lead, a semiconductor element adapted to engage said point contact element, an adjustable telescoping mount including a guide member formed integrally with said base and a lead engaged by said guide member and connected to said semiconductor element for supporting the latter in contact with said point contact element, means for mechanically uniting said guide member and lead in an adjusted position of said lead and a rigidified insulating body completely surrounding the assembly of the supported elements.

8. In an electrical device including a semiconductor element and a point contact element adapted to contact said semiconductor element, a base, a lead connected to said semiconductor element and slidably supported on said base, means for guiding said lead and for fixing said lead relative to said base, and a rigidified insulating body encasing said semiconductor and point contact elements.

9. In an electrical device including a semiconductor element and a point contact element adapted to contact said semiconductor element, an insulating grease completely surrounding said semiconductor and point contact elements, a base, a lead connected to said semiconductor element and slidably supported on said base, means for guiding said lead and for fixing said lead relative to said base, and a rigidified insulating body encasing said semiconductor and point contact elements.

10. The method of making an electrical device comprising the steps of fixing a contact element to a base serving as a reference, adjusting a semiconductor element relative to said base, fixing said semiconductor element in an adjusted position relative to said base wherein said elements are retained in adjusted configuration and engage each other with a predetermined contact pressure, surrounding said elements in an insulating grease, and encasing the surrounded elements in an insulating fluid capable of solidifying to retain said semiconductor element in said adjusted position.

11. The method of making an electrical device comprising the steps of fixing a contact element to a base serving as a reference, adjusting a semiconductor element relative to said base, fixing said semiconductor element in an adjusted position relative to said base wherein said elements and said base are retained in adjusted configuration and engage each other with a predetermined contact pressure, surrounding said elements in an insulating grease, and encasing the surrounded elements in an insulating fluid capable of solidifying to retain said semiconductor element in said adjusted position.

12. In an electrical device including a semiconductor element and a point contact element adapted to contact each other, a base, a lead connected to one of said elements and slidably supported on said base, means for guiding said lead during movement relative to said base, an insulating grease surrounding said elements, and a rigidified insulating body encasing the surrounded elements.

References Cited in the file of this patent

UNITED STATES PATENTS

| | | |
|---|---|---|
| 2,432,116 | McLean et al. | Dec. 9, 1947 |
| 2,432,594 | Thompson et al. | Dec. 16, 1947 |
| 2,572,993 | Douglas et al. | Oct. 30, 1951 |
| 2,595,475 | McLaughlin | May 6, 1952 |
| 2,632,042 | Fitchett | Mar. 17, 1953 |
| 2,666,873 | Slade | Jan. 19, 1954 |
| 2,688,110 | Domaleski et al. | Aug. 31, 1954 |

FOREIGN PATENTS

| | | |
|---|---|---|
| 371,651 | Italy | May 31, 1931 |